United States Patent
Takubo

(10) Patent No.: US 9,470,441 B2
(45) Date of Patent: Oct. 18, 2016

(54) DEHUMIDIFIER HAVING FLAT PLATE AIR-TO-AIR HEAT EXCHANGER

(71) Applicant: Takubo Machine Works Co., Ltd., Takehara-shi, Hiroshima-ken (JP)

(72) Inventor: Sadao Takubo, Takehara (JP)

(73) Assignee: Takubo Machine Works Co., Ltd., Hiroshima-Ken (JP)

( * ) Notice: Subject to any disclaimer, the term of this patent is extended or adjusted under 35 U.S.C. 154(b) by 675 days.

(21) Appl. No.: 13/724,100

(22) Filed: Dec. 21, 2012

(65) Prior Publication Data

US 2013/0160970 A1    Jun. 27, 2013

(30) Foreign Application Priority Data

Dec. 27, 2011 (JP) ................................. 2011-285068

(51) Int. Cl.
*F24F 7/00* (2006.01)
*F25B 29/00* (2006.01)
(Continued)

(52) U.S. Cl.
CPC ............. *F25B 29/00* (2013.01); *B01D 53/265* (2013.01); *D06F 58/24* (2013.01); *F24F 3/153* (2013.01);
(Continued)

(58) Field of Classification Search
CPC ............... F24F 3/14; F24F 2003/1446; F24F 2003/1452; F28F 3/005; F28F 3/08; F28F 3/083; F28F 3/10; F28F 9/0132; F28F 9/0137; B01D 53/265; F25B 29/00; F25D 2021/0038; F26B 21/086; F26B 23/004; F26B 23/005; F26B 23/008
USPC .................. 165/59–60, 164–166, 69, 81–82; 62/406, 93, 89, 92; 34/515
See application file for complete search history.

(56) References Cited

U.S. PATENT DOCUMENTS 1,638,107 A * 8/1927 Whiton .......................... 165/166
2,019,351 A * 10/1935 Lathrop ........................ 165/165
(Continued)

FOREIGN PATENT DOCUMENTS

CH    657692 A5    9/1986
DE    1111221 B    7/1961
(Continued)

OTHER PUBLICATIONS

European Communication mailed Jun. 28, 2013 in corresponding European Patent Application No. EP 12198285.4.
(Continued)

*Primary Examiner* — Judy Swann
*Assistant Examiner* — Jose O Class-Quinones
(74) *Attorney, Agent, or Firm* — Nields, Lemack & Frame, LLC

(57) ABSTRACT

A dehumidifier includes a suction unit, a dehumidifying unit having a chiller, a discharge unit having a heat radiator, a refrigerant circulating system, and a heat exchanger. The suction unit sucks humid air into the dehumidifying unit, which cools the humid air and condenses the moisture in the humid air to create dry air. The discharge unit heats and discharges the dry air coming from the dehumidifying unit, and the heat exchanger exchanges heat between the humid air and the dry air coming from the dehumidifying unit. The refrigerant circulating system is used to cool the humid air at the dehumidifying unit and to heat the dry air at the discharge unit. In some embodiments, the heat exchanger includes a heat transfer unit, wherein flat plates are turned back alternately in opposite directions, and a first and second flow passage are prepared alternately in many layers between the flat plates.

12 Claims, 7 Drawing Sheets

(51) Int. Cl.
    *B01D 53/26*     (2006.01)
    *F24F 13/30*     (2006.01)
    *F24F 3/153*     (2006.01)
    *F28D 9/00*     (2006.01)
    *D06F 58/24*     (2006.01)
    *F24F 12/00*     (2006.01)
    *F24F 3/14*     (2006.01)
    *F28D 21/00*     (2006.01)
    *D06F 58/20*     (2006.01)

(52) U.S. Cl.
    CPC ............. F24F 13/30 (2013.01); F28D 9/0025 (2013.01); *B01D 2259/4508* (2013.01); *D06F 58/206* (2013.01); *F24F 12/006* (2013.01); *F24F 2003/1446* (2013.01); *F24F 2003/1452* (2013.01); *F28D 2021/0038* (2013.01); *F28F 2230/00* (2013.01); *F28F 2275/20* (2013.01); *Y02B 30/563* (2013.01)

(56) References Cited

U.S. PATENT DOCUMENTS

| | | | | |
|---|---|---|---|---|
| 2,654,232 | A * | 10/1953 | Galazzi | F24F 3/14 261/138 |
| 3,829,945 | A | 8/1974 | Kanzler et al. | |
| 3,916,644 | A * | 11/1975 | Nasser | E01H 13/00 165/166 |
| 4,043,388 | A * | 8/1977 | Zebuhr | 165/166 |
| 4,116,271 | A * | 9/1978 | De Lepeleire | 165/166 |
| 4,135,370 | A * | 1/1979 | Hosoda et al. | 62/274 |
| 4,291,542 | A * | 9/1981 | Sminge et al. | 62/156 |
| 4,428,205 | A * | 1/1984 | Doderer | F24F 3/153 165/66 |
| 4,776,387 | A * | 10/1988 | Newman | 165/76 |
| 5,901,565 | A * | 5/1999 | Morton, Jr. | F24F 3/1405 165/103 |
| 6,378,604 | B1 * | 4/2002 | Feind et al. | 165/166 |
| 2004/0206486 | A1 * | 10/2004 | Whittenberger | B01J 19/249 165/165 |
| 2005/0204755 | A1 * | 9/2005 | Nishiwaki et al. | 62/93 |
| 2009/0205354 | A1 * | 8/2009 | Brown | F24F 3/1405 62/324.5 |
| 2010/0212334 | A1 * | 8/2010 | DeMonte et al. | 62/93 |

FOREIGN PATENT DOCUMENTS

| | | |
|---|---|---|
| JP | 36-21644 | 11/1961 |
| JP | 47-15472 A | 10/1972 |
| JP | 58-40128 A | 3/1983 |
| JP | 63-116098 A | 5/1988 |
| JP | 11-248388 A | 9/1999 |
| JP | 2000-320861 A | 11/2000 |

OTHER PUBLICATIONS

Chinese communication, with English translation, issued Feb. 3, 2015 in corresponding Chinese patent application No. 201210577859.X.

\* cited by examiner

DEHUMIDIFIER HAVING FLAT PLATE AIR-TO-AIR HEAT EXCHANGER

BACKGROUND OF THE INVENTION

The present invention relates to a dehumidifier to be installed in a room such as a drying chamber and is used to dehumidify the air in the room.

A type of dehumidifier has been known in the past, according to which a chiller is cooled down by vaporization heat, i.e. by vaporizing a refrigerant in liquid state. Then, humid air sucked from outside is chilled down by a chiller, and the humid air is dehumidified by condensation of the moisture contained in the humid air by chilling. The refrigerant is then liquefied by compressor, and dry air thus dehumidified is heated by condensation heat generated at the time of liquefaction. Then, the dry air is discharged to outside.

However, in case of a conventional type dehumidifier, temperature difference between the temperature of the humid air sucked from outside and the temperature of the dry air, which has been chilled down and dehumidified, is risen. Thus, problems may arise that electric power consumption required for chilling and temperature rise after dehumidification would be higher.

The Japanese Patent Publication JP-A-2000-320861 discloses a dehumidifier, according to which, after allowing the external air as sucked through air suction inlet to pass and to be heated by passing through one-half portion of an approximately U-shaped condenser, the heated air is passed to an evaporator cooled down. Then, a vapor in the air is efficiently condensed on the surface of the evaporator and dehumidified by rising temperature gradient of the air, and the dry air thus dehumidified is heated by passing through another one-half portion of the condenser, and the dried air after heating is discharged to outside via an air discharge outlet.

Also, the Japanese Patent Publication JP-A-Sho36-21644 discloses a heat exchanger having a heat transfer unit, wherein projections are prepared at a distribution ratio as required on a flat plate, the flat plate is folded back in multilayers alternately with such width as required, a gap for the projection is formed between the flat plates, and the flat plates are heat boundary. In the heat transfer unit, high temperature fluid and low temperature fluid are passed through the gap, and heat exchange operation is performed via the heat transfer unit.

SUMMARY OF THE INVENTION

It is an object of the present invention to provide a dehumidifier, by which it is possible to have higher thermal efficiency in the process of dehumidifying and to save electric power required.

To attain the above object, a dehumidifier according to the present invention comprises a suction unit which humid air is sucked in, a dehumidifying unit having a chiller and for cooling down the humid air sucked in and for dehumidifying by condensing the moisture in the humid air, a discharge unit having a heat radiator and for heating and discharging dry air as dehumidified at the dehumidifying unit, a refrigerant circulating system for cooling down the humid air at the dehumidifying unit and for heating the dry air at the discharge unit, and a heat exchanger for performing heat exchange between the humid air and the dry air as dehumidified at the dehumidifying unit.

Further, in the dehumidifier according to the present invention, a partition is disposed in the dehumidifying unit, and there are provided a humid air flow passage which the humid air passes through and a dry air flow passage which the dry air passes through.

Further, in the dehumidifier according to the present invention, the heat exchanger comprises a casing arranged in a hollow box and a heat transfer unit accommodated in the casing, and flat plates are turned back alternately in opposite directions, and a first flow passage and a second flow passage are prepared alternately in many layers between the flat plates, and among a front plate and a rear plate running in parallel to a return line of the flat plate of the casing, a high temperature fluid inlet and a high temperature fluid outlet being communicated with the second flow passage are disposed on the front plate side, and a low temperature fluid inlet and a low temperature fluid outlet being communicated with the first flow passage are disposed on the rear plate side, a lateral plate sealing member to cover entire region of the end unit and a pressing plate having rigidity are installed between lateral plate being at a position opposite to an end of the heat transfer unit and the heat transfer unit, a biasing means is disposed between the pressing plate and the lateral plate, the biasing means presses the lateral plate sealing member toward an end of the heat transfer unit via the pressing plate, and the lateral plate sealing member airtightly blocks the first flow passage and the second flow passage.

Further, in the dehumidifier according to the present invention, the biasing means is a coil spring arranged at a distribution rate as required, a flange nut is inserted from a side of the pressing plate of the coil spring, a spring supporting bolt to be inserted in the lateral plate is threaded on the flange nut, and by fastening the spring supporting bolt and by compressing the coil spring, pressing force onto the pressing plate of the spring is constrained, and by loosening the spring supporting bolt, constraining of the coil spring is released so that pressing force is applied onto the pressing plate.

Further, in the dehumidifier according to the present invention, a flat plate on the uppermost portion and a flat plate on the lowermost portion of the heat transfer unit are folded back in the same direction, a sealing member is engaged with each of a forward end of the flat plate of the uppermost portion and a forward end of the flat plate of the lowermost portion, and the sealing members are squeezed by an edge holding hardware disposed on a top plate of the casing and the top plate, and by the edge holding hardware disposed on a bottom plate of the casing and the bottom plate, and the heat transfer unit is fixed.

Further, in the dehumidifier according to the present invention, projecting portions are projected on each of a front side and a rear side of the flat plate folded back, the projecting portion on front surface of the flat plate and the projecting portion on rear surface are brought face to face to each other, and a gap serving as a flow passage is formed between the flat plates placed opposite to each other.

Further, in the dehumidifier according to the present invention, side end portions of the flat plate are air-tightly connected so that the first flow passage or the second flow passage is blocked, and the second flow passage and the first flow passage are separated from each other.

According to the present invention, the dehumidifier comprises a suction unit which humid air is sucked in, a dehumidifying unit having a chiller and for cooling down the humid air sucked in and for dehumidifying by condensing the moisture in the humid air, a discharge unit having a heat radiator and for heating and discharging dry air as dehumidified at the dehumidifying unit, a refrigerant circulating system for cooling down the humid air at the dehumidifying unit and for heating the dry air at the discharge unit, and a heat exchanger for performing heat exchange between the humid air and the dry air as dehumidified at the dehumidifying unit. As a result, less heat amount is needed for cooling down the humid air and thermal efficiency in the dehumidifying process can be extensively increased, and electric power can be saved.

Further, according to the present invention, in the dehumidifier, a partition is disposed in the dehumidifying unit, and there are provided a humid air flow passage which the humid air passes through and a dry air flow passage which the dry air passes through. As a result, it is possible to efficiently perform dehumidifying process because the humid air before the dehumidifying process and the dry air after the dehumidifying processes are not mixed together.

Further, according to the present invention, in the dehumidifier, the heat exchanger comprises a casing arranged in a hollow box and a heat transfer unit accommodated in the casing, flat plates are turned back alternately in opposite directions, and a first flow passage and a second flow passage are prepared alternately in many layers between the flat plates, and among a front plate and a rear plate running in parallel to a return line of the flat plate of the casing, a high temperature fluid inlet and a high temperature fluid outlet being communicated with the second flow passage are disposed on the front plate side, and a low temperature fluid inlet and a low temperature fluid outlet being communicated with the first flow passage are disposed on the rear plate side, a lateral plate sealing member to cover entire region of the end unit and a pressing plate having rigidity are installed between lateral plate being at a position opposite to an end of the heat transfer unit and the heat transfer unit, a biasing means is disposed between the pressing plate and the lateral plate, the biasing means presses the lateral plate sealing member toward an end of the heat transfer unit via the pressing plate, and the lateral plate sealing member airtightly blocks the first flow passage and the second flow passage. As a result, it is possible to carry out disassembling procedure in easier manner, and maintenance services such as cleaning can be conveniently performed.

Further, according to the present invention, in the dehumidifier, the biasing means is a coil spring arranged at a distribution rate as required, a flange nut is inserted from a side of the pressing plate of the coil spring, a spring supporting bolt to be inserted in the lateral plate is threaded on the flange nut, and by fastening the spring supporting bolt and by compressing the coil spring, pressing force onto the pressing plate of the spring is constrained, and by loosening the spring supporting bolt, constraining of the coil spring is released so that pressing force is applied onto the pressing plate. As a result, no reaction force of the coil spring is applied on the lateral plate when mounting or removing the lateral plate, and mounting and removing of the lateral plate can be easily carried out.

Further, according to the present invention, in the dehumidifier, a flat plate on the uppermost portion and a flat plate on the lowermost portion of the heat transfer unit are folded back in the same direction, a sealing member is engaged with each of a forward end of the flat plate of the uppermost portion and a forward end of the flat plate of the lowermost portion, and the sealing members are squeezed by an edge holding hardware disposed on a top plate of the casing and the top plate, and by the edge holding hardware disposed on a bottom plate of the casing and the bottom plate, and the heat transfer unit is fixed. As a result, there is no need to physically fix the heat transfer unit by the procedure such as welding, and the reduction of the cost can be achieved.

Further, according to the present invention, in the dehumidifier, projecting portions are projected on each of a front side and a rear side of the flat plate folded back, the projecting portion on front surface of the flat plate and the projecting portion on rear surface are brought face to face to each other, and a gap serving as a flow passage is formed between the flat plates placed opposite to each other. As a result, the height of the projecting portion required for forming the flow passage may be only one-half. To fabricate the flat plate is facilitated, and the manufacturing cost can be reduced.

Furthermore, according to the present invention, in the dehumidifier, side end portions of the flat plate are air-tightly connected so that the first flow passage or the second flow passage is blocked, and the second flow passage and the first flow passage are separated from each other. As a result, the low temperature fluid flowing through the first flow passage and the high temperature fluid flowing through the second flow passage are not mixed together, and universal adaptability can be achieved.

DETAILED DESCRIPTION OF THE PREFERRED EMBODIMENT

Description will be given below on an embodiment of the present invention by referring to the attached drawings.

Figure 1:
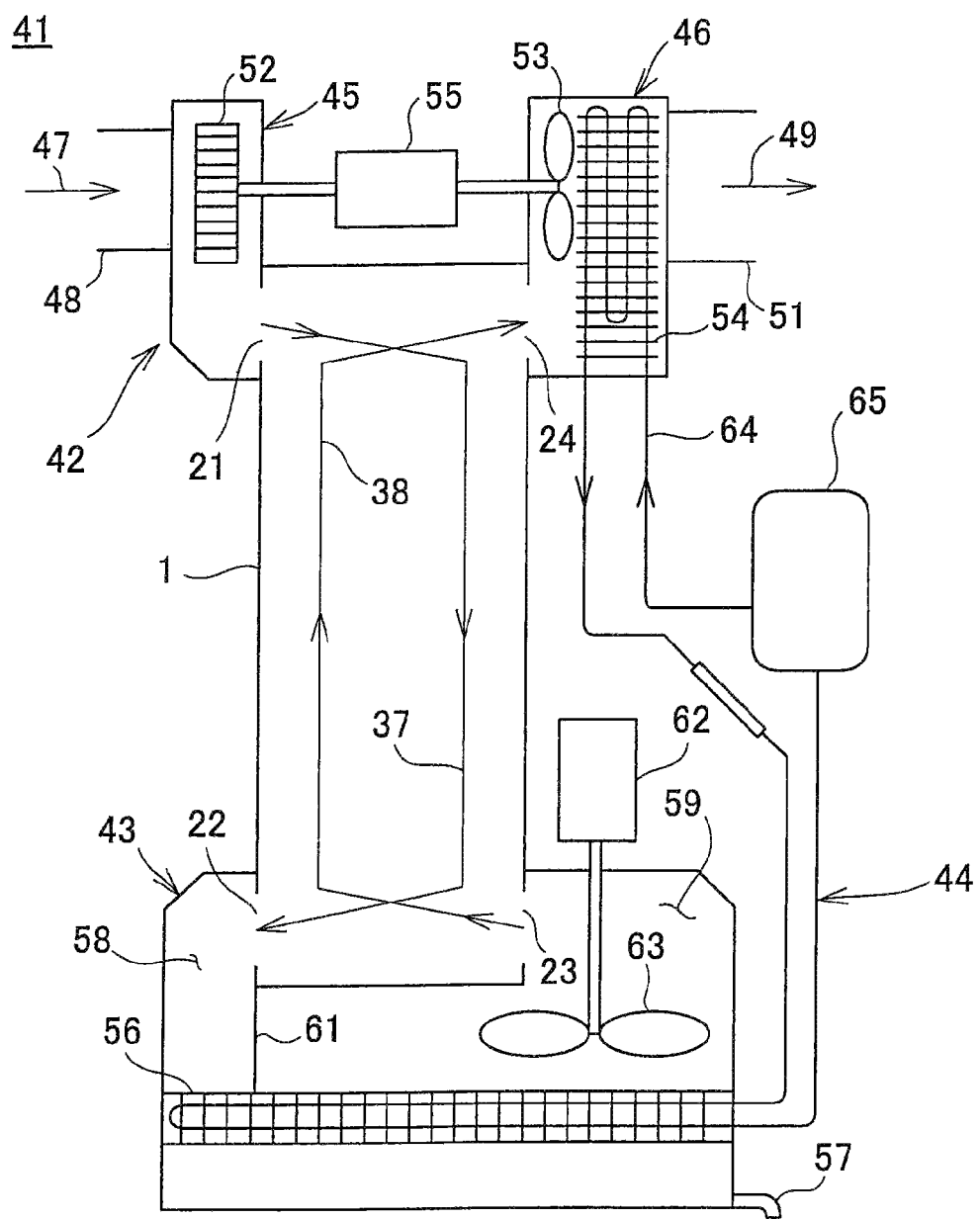
FIG. 1 is a schematical drawing to show an arrangement of a dehumidifier according to an embodiment of the present invention.

First, referring to FIG. 1, description will be given on an arrangement of a dehumidifier according to an embodiment of the present invention.

A dehumidifier 41 primarily comprises an air suction and discharging unit 42, a heat exchanger 1, a dehumidifying unit 43, and a refrigerant circulating system 44. The air suction and discharging unit 42 is disposed at an end of the heat exchanger 1, and the dehumidifying unit 43 is provided at the other end of the heat exchanger 1.

The air suction and discharge unit 42 comprises a suction unit 45 and a discharge unit 46. The suction unit 45 has a suction inlet 48 to suck humid air 47 and a high temperature fluid inlet 21 to take the humid air 47 into the heat exchanger 1. The discharge unit 46 has a low temperature fluid outlet 24 where dry air 49 flows in and a discharge outlet 51 to discharge the dry air 49.

In the suction unit 45, a suction fan 52 is provided, which sucks the humid air 47 from outside via the suction inlet 48 and discharges the humid air 47 via the high temperature fluid inlet 21. An exhaust fan 53 and a heat radiator 54 are accommodated in the discharge unit 46. The exhaust fan 53 takes the dry air 49 via the low temperature fluid outlet 24 and discharges the dry air 49 through the discharge outlet 51 via the heat radiator 54.

The suction fan 52 and the exhaust fan 53 are designed to be integrally rotated by a first fan motor 55. It may be so arranged that the suction fan 52 and the exhaust fan 53 are separately rotated by two motors respectively.

In the dehumidifying unit 43, a chiller 56 is provided to separate space in the dehumidifying unit 43 to upper and lower portions, and a drain pipe 57 is disposed at a lower end of the dehumidifying unit 43 so that the water condensed in the dehumidifying unit 43 will be discharged. Further, in the dehumidifying unit 43, a partition 61 to divide a space above the chiller 56 to a humid air flow passage 58 and a dry air flow passage 59. On an upper flowing end of the humid air flow passage 58, a high temperature fluid outlet 22 is disposed, and a low temperature fluid inlet 23 is disposed at a lower end of the dry air flow passage 59.

Figure 3:
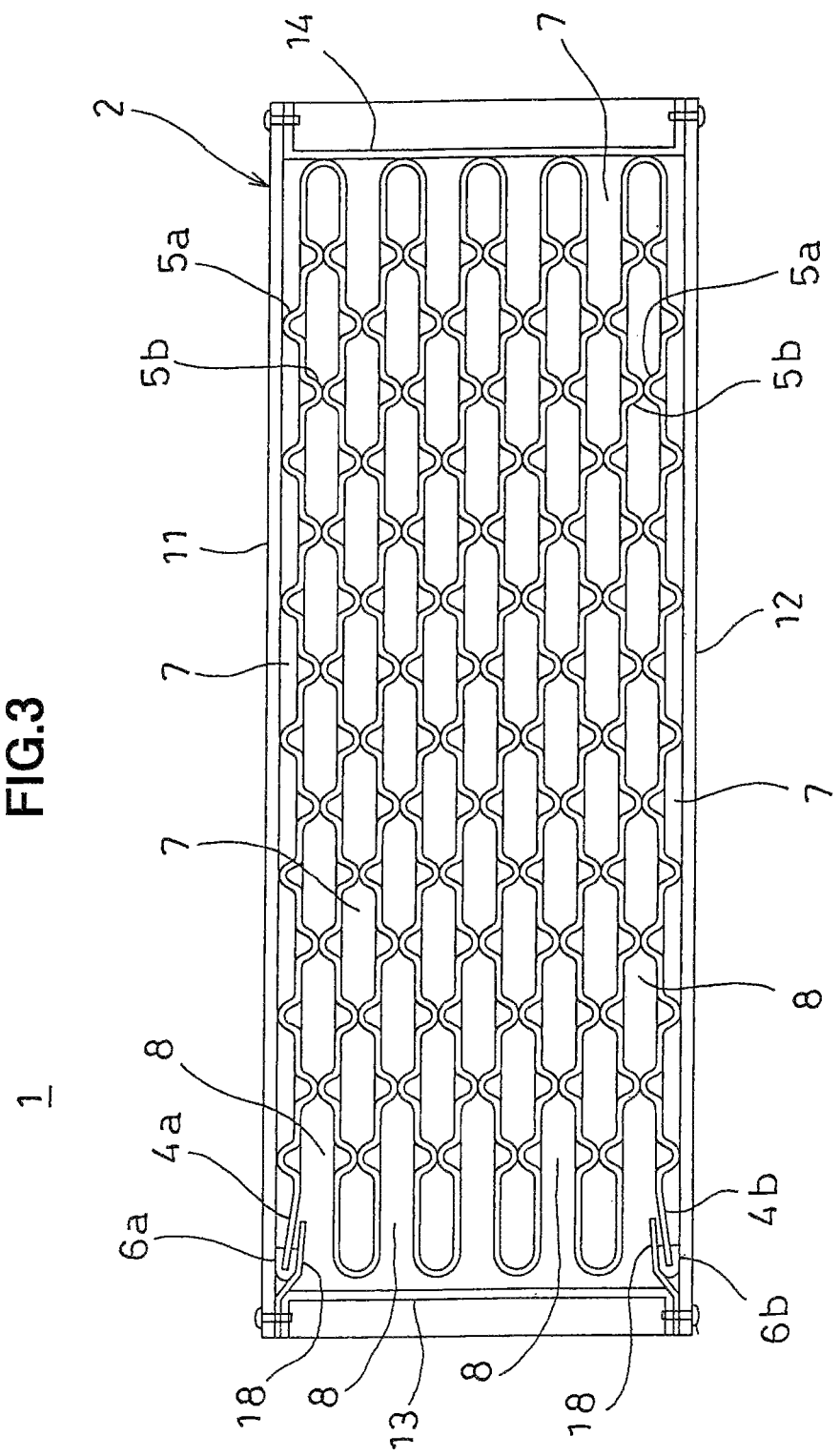
FIG. 3 is an arrow diagram along the line A-A in FIG. 2.

As shown in FIG. 3, a first flow passage 7 (to be described later) where a low temperature fluid 38 passes through and a second flow passage 8 (to be described later) where a high temperature fluid 37 passes through are formed inside the heat exchanger 1. An upper flowing end of the second flow passage 8 is communicated with the high temperature fluid inlet 21, and a lower flowing end of the second flow route 8 is communicated with the high temperature fluid outlet 22. An upper flowing end of the first flow passage 7 is communicated with the low temperature fluid inlet 23, and a lower flowing end of the first flow passage 7 is communicated with the low temperature fluid outlet 24.

A stirring fan 63 to be driven by a second fan motor 62 is provided along the dry air flow passage 59, and the stirring fan 63 sucks the dry air 49 in the dry air flow passage 59 so as to promote the flowing of the dry air 49.

The refrigerant circulating system 44 comprises a refrigerant pipe 64 in which the refrigerant flows and a compressor 65 to compress and liquefy a refrigerant in the refrigerant pipe 64, and the refrigerant pipe 64 is connected to the heat radiator 54 and the chiller 56. The refrigerant is circulated by the compressor 65 between the heat radiator 54 and the chiller 56 via the refrigerant pipe 64. The refrigerant is then liquefied by the compressor 65 and radiates heat via the heat radiator 54. Then, the refrigerant is vaporized by the chiller 56 and cools down the chiller 56.

Next, description will be given on dehumidification by the dehumidifier 41.

The first fan motor 55, the second fan motor 62, and the compressor 65 are driven. By the driving of the first fan motor 55, the suction fan 52 and the exhaust fan 53 are rotated, and by the driving of the second fan motor 62, the stirring fan 63 is rotated. By the compressor 65, the refrigerant circulating system 44 is driven.

By rotation of the suction fan 52, the exhaust fan 53, and the stirring fan 63, the humid air 47 is sucked in through the suction inlet 48. The humid air 47 is passed through the heat exchanger 1 as the high temperature fluid 37 and is flown into the humid air flow passage 58 via the high temperature fluid outlet 22. The high temperature fluid 37 is cooled down by the chiller 56 as the high temperature fluid 37 passes through the chiller 56 to lower than dew-point temperature, and is dehumidified. The air thus dehumidified is flown into the heat exchanger 1 as the low temperature fluid 38 via the low temperature fluid inlet 23. Heat exchange is performed between the high temperature fluid 37 and the low temperature fluid 38 in the heat exchanger 1. Then, the high temperature fluid 37 is cooled down by the low temperature fluid 38, and a temperature of the low temperature fluid 38 is risen by the high temperature fluid 37.

The low temperature fluid 38 is discharged via the low temperature fluid outlet 24. The low temperature fluid 38 is then heated in a process to pass through the heat radiator 54 and the low temperature fluid 38 is discharged as the dry air 49 via the discharge outlet 51.

By driving the compressor 65, the refrigerant is circulated in the refrigerant circulating system 44.

The refrigerant in gaseous state as passing through the refrigerant pipe 64 is compressed by the compressor 65 and is liquefied. In this process, condensation heat is generated, and temperature is risen by the fact that the refrigerant is compressed and liquefied. The refrigerant with risen temperature radiates heat as the refrigerant passes through the heat radiator 54 and heats up the low temperature fluid 38.

The refrigerant of the fluid, which has been cooled down by passing through the heat radiator 54, is guided to the chiller 56 via the refrigerant pipe 64. The refrigerant is then expanded at the chiller 56 and is vaporized. By the vaporization of the refrigerant, heat in the surrounding is taken away, and the chiller 56 is cooled down. The chiller 56 cools down the humid air 47 to a level lower than the dew-point temperature.

The refrigerant thus vaporized is guided toward the compressor 65 via the refrigerant pipe 64, and the refrigerant is then compressed by the compressor 65 again and is liquefied.

The circulation of the refrigerant as described above is repeated until the dehumidifying by the dehumidifier 41 is stopped.

As an example of the dehumidification processing as described above, the humid air 47 at normal temperature, e.g. the humid air 47 at temperature of 20° C. and at humidity of 60%, flows into the suction unit 45 from outside.

The humid air 47 flown into the suction unit 45 passes through the second flow route 8 (see FIG. 3). Then, heat exchange is performed with the dry air 49, which is flowing along the first flow route 7 (see FIG. 3) by the heat exchanger 1. For instance, the humid air 47 is cooled down to 10° C. and flows via the humid air flow passage 58. Then, the humid air 47 passes through the chiller 56, flow through a space under the chiller 56, passes through the chiller 56 again and flows into the dry air flow passage 59 as the dry air 49.

In this case, the chiller 56 is cooled down by heat exchange with the refrigerant, which passes through the refrigerant pipe 64. During the process to pass through the chiller 56, the humid air 47 is cooled down to temperature lower than the dew-point temperature, and moisture condensed by the refrigeration is attached on each of the fins of the chiller 56. Therefore, the humid air 47 is dehumidified by the chiller 56. For instance, the humid air 47 flows into the dry air flow passage 59 as the dry air 49 at temperature of 5° C. and the humidity of 30%. Also, the flowing of the humid air 47 and the dry air 49 from the humid air flow passage 58 to the dry air flow passage 59 is promoted by the stirring fan 63.

The moisture attached to the fins of the chiller 56 is dropped to the bottom of the dehumidifying unit 43 and is discharged to outside via the drain pipe 57.

The dry air 49 as flown into the dry air flow passage 59 further flows into the heat exchanger 1 via the low temperature fluid inlet 23. After flowing into the heat exchanger 1, the dry air 49 passes through the first flow passage 7, and heat exchange is performed to and from the humid air 47, which passes through the second flow passage 8. For instance, the dry air 49 is heated up to 15° C., and the dry air 49 flows into the discharge unit 46 via the low temperature fluid outlet 24.

The heat radiator 54 is heated by the refrigerant, which passes through the refrigerant pipe 64, and the dry air 49 flowing into the discharge unit 46 is heated to 25° C., for instance, by heat exchange to and from the heat radiator 54. By being heated, the dry air 49 is discharged to outside via the discharge outlet 51 as the dry air 49, which is dried more.

In the present embodiment, the dehumidifier 41 has the heat exchanger 1. By the heat exchanger 1, heat exchange operation is performed, i.e. the heat exchange is performed between the humid air 47 at normal temperature (20° C.) and the dry air 49, which has been cooled down to lower than the dew-point temperature by the chiller 56. Therefore, heat amount to be needed to cool down the humid air 47 to dew-point may not be much, and it is possible to extensively increase thermal efficiency in the dehumidifying process, and to save of electric power.

Because the dehumidifier 41 is equipped with the heat radiator 54, which is connected to the refrigerant pipe 64 in the discharge unit 46, and condensation heat generated during the liquefying of the refrigerant can be collected by the dry air 49, and the refrigerant can be cooled down. It is possible to efficiently perform dehumidification without decreasing the temperature of the air sucked in.

Because the partition 61 is provided in the humidifying unit 43, the humid air 47 before the dehumidifying, which passes through the humid air flow passage 58, is not mixed with the dry air 49 after dehumidification passing through the dry air flow passage 59, and it is possible to promote efficient dehumidifying.

In the dehumidifier 41 as described above, the stirring fan 63 is provided for promoting the flowing of the dry air 49 in the dehumidifying unit 43. However, the second fan motor 62 and the stirring fan 63 may not be used in a case where a flow passage resistance is not much when the dry air 49 passes through the chiller 56.

Figure 4:
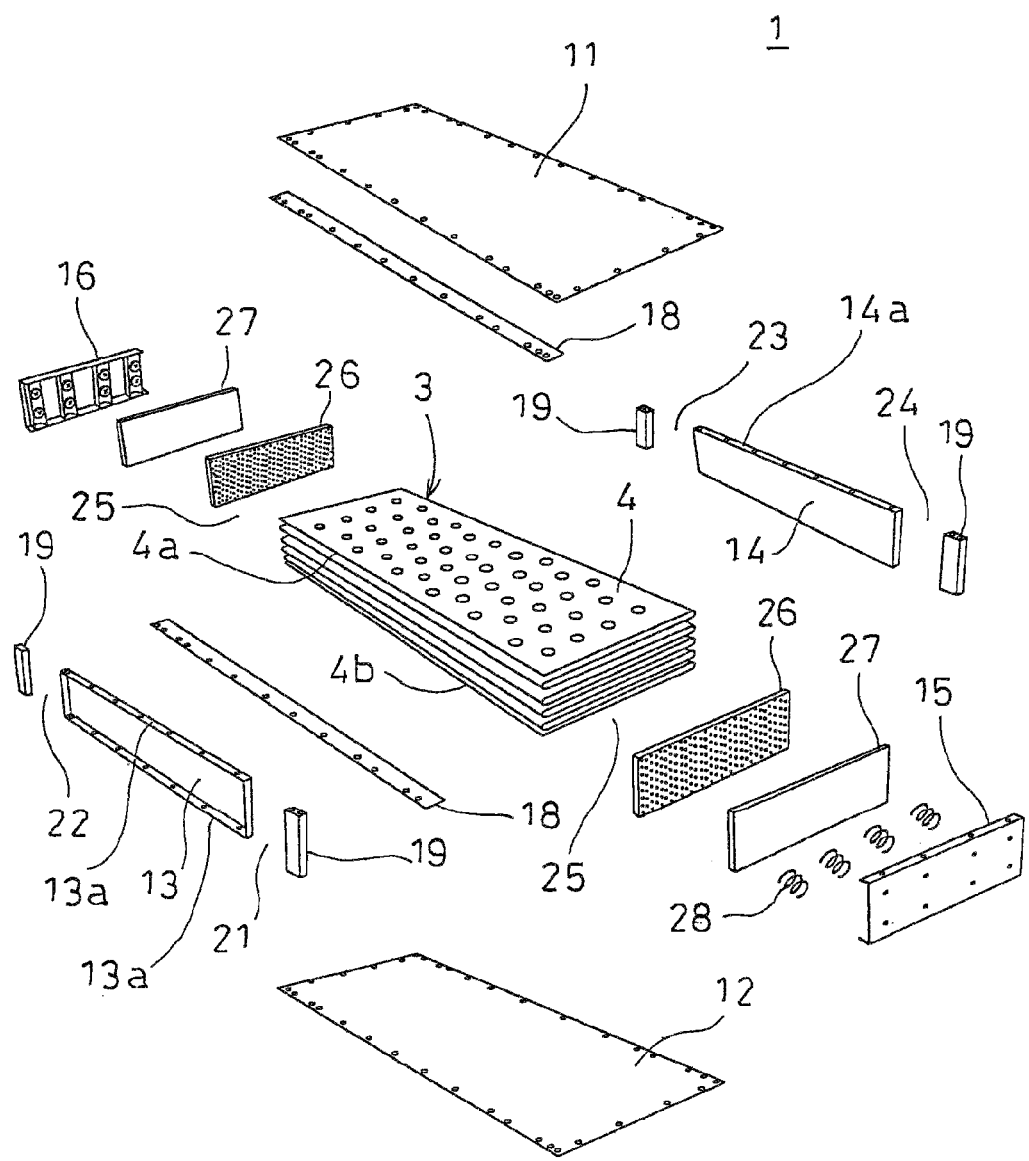
FIG. 4 is an exploded perspective view of the heat exchanger as given above, FIG. 5A and FIG. 5B each represents a partial cross-sectional view of an end portion of the heat exchanger.

First, referring to FIG. 2 to FIG. 4, description will be given on a heat exchanger 1, which is an embodiment of the present invention.

A heat exchanger 1 comprises a casing 2 configurated by a hollow box and a heat transfer unit 3 accommodated within the casing 2.

The heat transfer unit 3 consists of a flat plate 4 made of a material with high thermal conductivity such as aluminum by folding the flat plate 4 alternately on each other in zigzag manner so as to be a multilayer plate. Folding lines of the flat plate 4 are consistent with each other in up-and-down direction so that the folding lines are included within same plane.

In the flat plate 4, projecting portions 5a and 5b are formed by presswork in a distribution as predetermined. The projecting portion 5a and the projecting portion 5b are formed alternately in two planar directions respectively. With the flat plate 4 in folded condition, the projecting portion 5a is projected toward upper surface side of the flat plate 4, and the projecting portion 5b is projected toward lower surface side so that the projecting portion 5a and the projecting portion 5b are brought face to face with each other. On the heat transfer unit 3, it is preferable that an end edge 4a on the uppermost layer of the flat plate 4 is on the same side as an end edge 4b of the lowermost layer (on left side in FIG. 3). On the end edges 4a and 4b, sealing members 6a and 6b, each designed to have a U-shaped cross-section, are fixed over total length. Each of the sealing members 6 is made of a highly elastic material having heat-resistant property, and a material such as silicone rubber is used, for instance.

Each of the end edges 4a and 4b is tilted toward upper side and toward lower side by an extent approximately equal to projecting height of the projecting portions 5a and 5b.

Between sites confronted each other of the flat plate 4, a gap is formed by the projecting portions 5a and 5b. This gap forms a first flow passage 7 and a second flow passage 8 as partitioned by the flat plate 4. As to be described later, a low temperature fluid 38 passes through the first flow passage 7 and a high temperature fluid 37 passes through the second flow passage 8.

The projecting portion 5 may be so designed that the projecting portion 5 is projected only in one direction. In this case, the projecting portion 5 must have a height twice as high as heights of the projecting portions 5a and 5b. If it is so arranged that the end edges 4a and 4b are projected to some extent beyond the folding lines of the flat plate 4 and the end edges 4a and 4b are butted against a front plate 13 (as to be described later) respectively, an edge holding hardware 18 may be omitted.

Next, description will be given on the casing 2.

Figure 2:
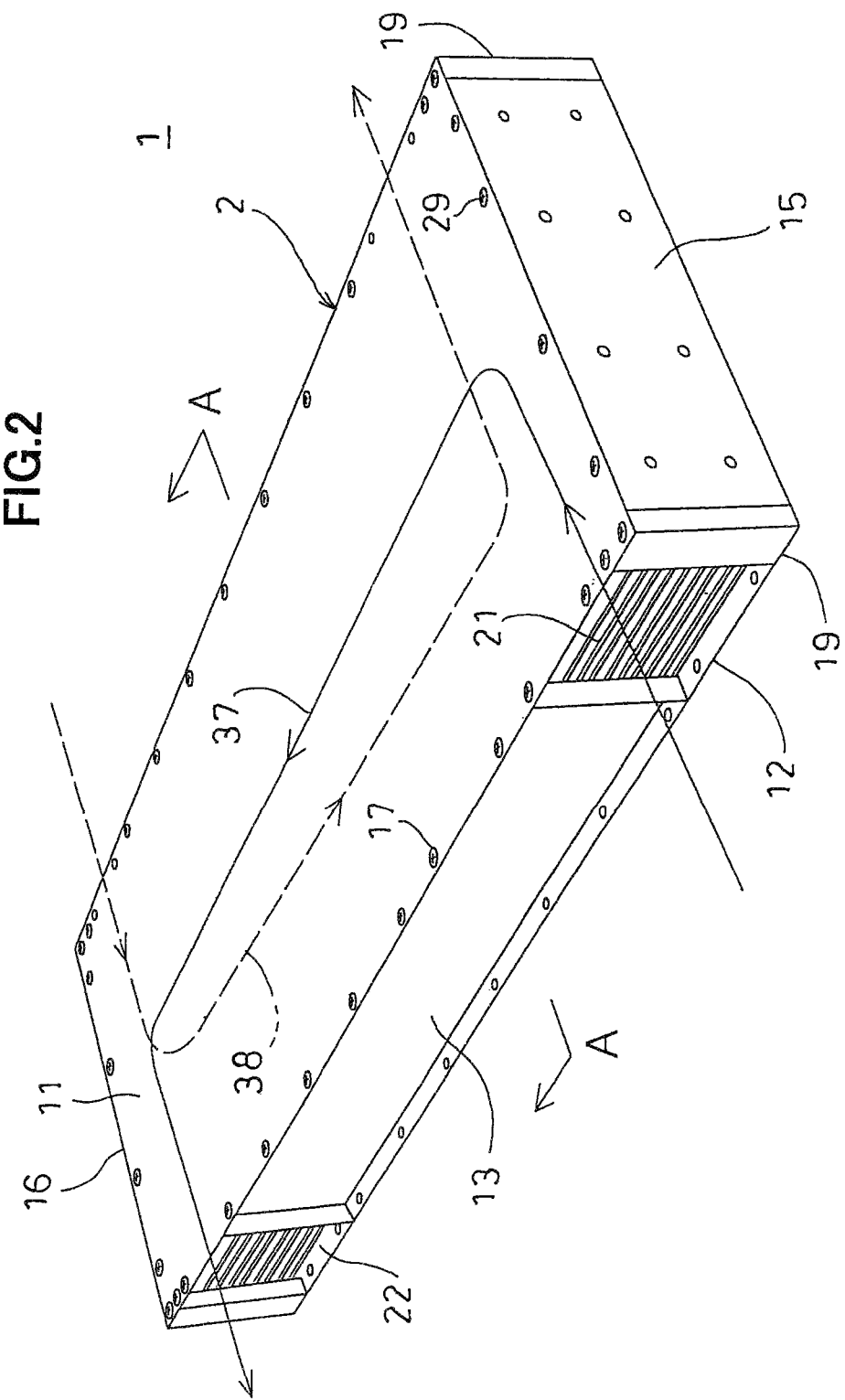
FIG. 2 is a schematical perspective view of a heat exchanger according to the embodiment of the present invention.

The casing 2 is primarily assembled by fixing a top plate 11, a bottom plate 12, the front plate 13, a rear plate 14, a right lateral plate (a lateral plate on right side with respect to the front plate 13 in FIG. 2) 15 and a left lateral plate 16 by using bolts 17. The top plate 11 and the bottom plate 12 run in parallel to a plane of the flat plate 4 of the heat transfer unit 3. The front plate 13 and the rear plate 14 run in parallel to a plane including the folding lines of the flat plate 4, and the right lateral plate 15 and the left lateral plate 16 are confronted with an end portion of the flat plate 4 (i.e. the heat transfer unit 3).

First, description will be given on assembling of the top plate 11 and the bottom plate 12 with the front plate 13 and the rear plate 14 respectively.

The front plate 13 and the rear plate 14 have edge portions 13a and 14a of four sides of the front plate 13 and the rear plate 14 respectively and the edge portion 13a and the edge portion 14a are folded at right angle in outer direction. Both the front plate 13 and the rear plate 14 are designed to be shorter than the top plate 11 and the bottom plate 12.

With the edge portion 14a fixed on the top plate 11 and on the bottom plate 12 by the bolt 17 respectively, the top plate 11 and the bottom plate 12 are assembled with the rear plate 14. The edge holding hardwares 18 are positioned between the edge portion 13a and the top plate 11 and between the edge portion 13a and the bottom plate 12 respectively. With the edge portion 13a fixed on the top plate 11 and the bottom plate 12 respectively by the bolt 17, the top plate 11 and the bottom plate 12 are assembled with the front plate 13. The edge holding hardwares 18 are fastened together between the edge portion 13a and the top plate 11 and between the edge portion 13a and the bottom plate 12 respectively. For the purpose of improving air-tightness, sealing members may be interposed between the edge portions 13a, 14a and the top plate 11, the bottom plate 12 respectively.

The edge holding hardwares 18 and 18 are tilted so as to separate from the top plate 11 and the bottom plate 12 respectively, and so as to form a V-shaped groove between the top plate 11 and the bottom plate 12 respectively.

As described above, the end edges 4a and 4b are tilted in upper direction and in lower direction by an extent approximately equal to projection height of the projecting portions 5a and 5b respectively. It is so arranged that the sealing member 6a is closely attached to the top plate 11 when the top plate 11 is brought into contact with the projecting portion 5a of the uppermost layer, and that the sealing member 6b is closely attached to the bottom plate 12 when the bottom plate 12 is closely fitted to the projecting portion 5b of the lowermost layer.

Under the condition that the end edges 4a and 4b are inserted into the V-shaped groove, the end edges 4a and 4b are sandwiched between the edge holding hardwares 18 and the top plate 11 and between the edge holding hardwares 18 and the bottom plate 12 respectively via the sealing members 6a and 6b. Under the condition that the end edges 4a and 4b are sandwiched, the sealing members 6a and 6b are compressed by the pressure as required.

At four corners of the top plate 11 and the bottom plate 12, support pillars 19, each designed to have a rectangular cross-section, are fixed by screws. The high temperature fluid inlet 21 and the high temperature fluid outlet 22 are formed between the two support pillars 19 on front side and the front plate 13. Also, the low temperature fluid inlet 23 and the low temperature fluid outlet 24 are formed between two support pillars 19 on rear side and the rear plate 14.

Next, description will be given below on assembling of the top plate 11 and the bottom plate 12 with the right lateral plate 15 and the left lateral plate 16 respectively.

The assembling of the right lateral plate 15 and the left lateral plate 16 is performed symmetrically and in the same structure with each other. Therefore, description will be given below on the assembling of the right lateral plate 15.

By arranging in such a manner that the heat transfer unit 3 is accommodated in a space formed by the top plate 11, the bottom plate 12, the front plate 13 and the rear plate 14, and that the end edges 4a and 4b of the heat transfer unit 3 are sandwiched by the edge holding hardwares 18, and the heat transfer unit 3 can be fixed on the top plate 11 and the bottom plate 12. Under this condition, openings 25 and 25 each in rectangular shape can be formed on the left and right by the top plate 11, the bottom plate 12, the front plate 13 and the rear plate 14 respectively.

The openings 25 can be closed by the right lateral plate 15 via a planar type lateral plate sealing member 26 and via a holding plate 27. The lateral plate sealing member 26 is used to cover the entire area of the end portion of the heat transfer unit 3, and end portions of the first flow passage 7 and the second flow passage 8 are air-tightly closed by the lateral plate sealing member 26. The lateral plate sealing member 26 is made of a highly elastic material with heat-resistant property, and silicone rubber is adopted, for instance. As the holding plate 27, a material with rigidity—a steel plate, for instance—is used.

The holding plate 27 is provided in such a manner that the holding plate 27 can be brought closer to or separated from (i.e. displaceable in left and right directions respectively) the heat transfer unit 3. A spring 28, i.e. a compression coil spring, is interposed between the holding plate 27 and the right lateral plate 15, and the lateral plate sealing member 26 is pressed on an end surface of the heat transfer unit 3 via the holding plate 27 by using the spring 28.

Figure 5A:
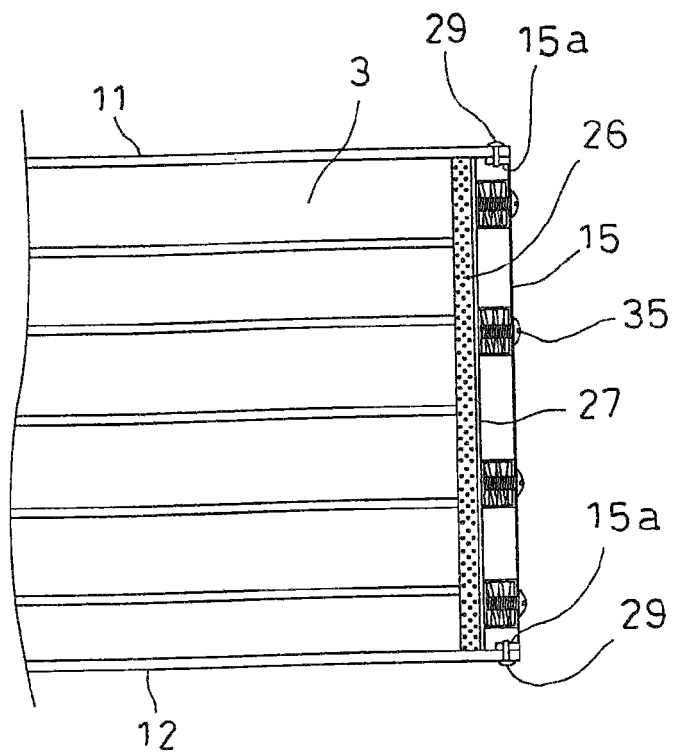
FIG. 5A is a drawing to show a condition where a right lateral plate is mounted and a coil spring is not released.

Description will be given below further by referring to FIG. 5 and FIG. 6.

The right lateral plate 15 has edge portions 15a, i.e. upper and lower two edge portions, which are bent at right angle in inner direction. By fixing the edge portions 15a on the top plate 11 and the bottom plate 12 respectively by means of bolts 29, the right lateral plate 15 are mounted on the top plate 11 and the bottom plate 12. For the purpose of increasing air-tightness, the sealing material may be interposed between the edge portion 15a and the top plate 11 and between the edge portion 15a and the bottom plate 12 respectively.

The right lateral plate 15 has biasing means to press the holding plate 27 on the lateral plate sealing member 26.

On inner surface of the right lateral plate 15, a spring holder 32, which is formed by bending a band-like plate member in U-shaped form, is fixed by means as required such as spot welding. An open end of the spring holder 32 is designed to face in inner direction and, a recessed groove 33 is formed. As many springs 28 as appropriate (in FIG. 4, two springs are shown at upper and lower positions respectively) are accommodated in the recessed groove 33. The spring holder 32 functions as a guiding member to hold the springs 28, which are biasing means, and the spring holder 32 also functions as a reinforcing member for the right lateral plate 15. The biasing means is not limited to the compression coil spring, and a plate spring or the like may be used.

A flange nut 34 is inserted from inside of the spring 28. The flange nut 34 has a nut portion 34a and a flange portion 34b. On outer lateral surface of the flange nut 34, a tapered portion 34c is formed, and it is so designed that the tapered portion 34c is engaged with inner diameter of the spring 28, and that a center of the tapered portion 34c matches well with a center of the spring 28.

From outside of the right lateral plate 15, a spring supporting bolt 35 is inserted so that the spring supporting bolt 35 is engaged with the nut portion 34a.

Figure 6A:
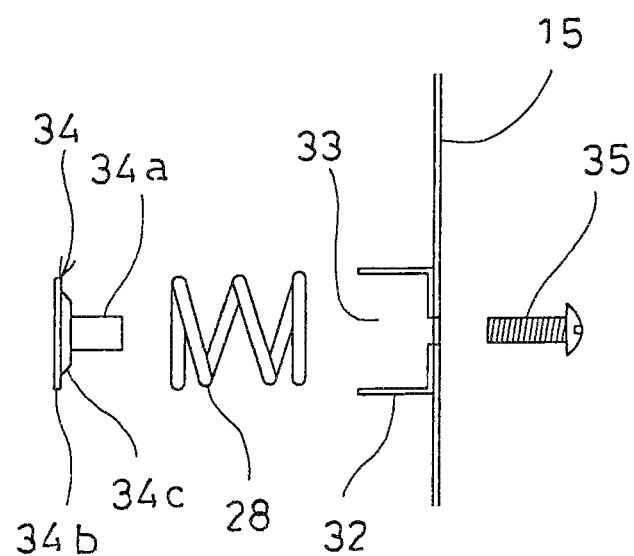
FIG. 6A shows a condition in disassembled state.
Figure 6B:
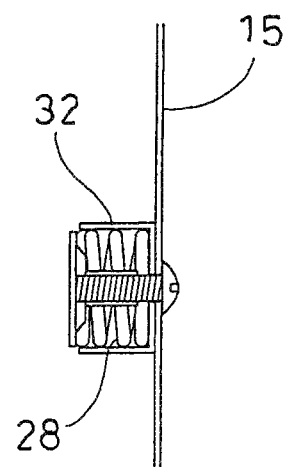
FIG. 6B shows a condition where the coil spring is completely compressed.

The spring 28 is accommodated in the recessed groove 33, and the flange nut 34 is inserted into the spring 28. Further, the spring supporting bolt 35 is engaged with the flange nut 34, and the spring supporting bolt 35 is tightened. As a result, the flange nut 34 is displaced toward the right lateral plate 15, and the spring 28 is compressed and deformed. FIG. 6B shows a condition where the spring 28 is sufficiently deformed and is accommodated in the recessed groove 33, and a forward end surface of the flange portion 34b is brought approximately on the same level as an inner end of the spring holder 32. It is understood that all of the springs 28 are under the condition as shown in FIG. 6B.

The lateral plate sealing member 26 and the holding plate 27 are sequentially inserted into the opening 25. All of the springs 28 are accommodated in the recessed groove 33, and the right lateral plate 15 is set into the opening 25. Then, right lateral plate 15 is fixed on the top plate 11 and the bottom plate 12 by means of the bolts 29.

Under this condition, the springs 28 are restricted and no pressing force is applied on the holding plate 27. That is, the right lateral plate 15 receives no reaction force from the holding plate 27. As a result, positioning can be easily achieved when the right lateral plate 15 is mounted, and the right lateral plate 15 can be mounted in easier manner.

When the mounting of the right lateral plate 15 is completed, the spring holding bolts 35 are loosened, and the springs 28 are brought into free condition. Even under the condition where the restriction by the spring holding bolts 35 are left free, the springs 28 are maintained in compressed state, and the restoring forces of the springs 28 are transmitted to the lateral plate sealing member 26 via the holding plate 27. Because the lateral plate sealing member 26 is made of a highly elastic material, a portion where the end surface of the flat plate 4 is brought into contact is recessed by the restoring forces of the springs 28. As a result, each of four end surfaces of the flat plate 4 is engaged into the lateral plate sealing member 26, and the end surfaces of the heat transfer unit 3 are totally closed in air-tight manner by the lateral plate sealing member 26.

The holding plate 27 is not supported physically and is kept in free condition. Because the holding plate 27 is pressed by a number of springs 28, the holding plate 27 is uniformly brought into touch with end portion of the heat transfer unit 3, and uniform sealing property can be maintained over the entire end portion. Each of the springs 28 is deformed by the spring supporting bolt 35, and strong force is not required for the deforming. On the other hand, a number of springs 28 are provided with such distribution as required. As a result, high pressing force and uniform pressing force can be applied on the lateral plate sealing member 26 as a whole.

Figure 5B:
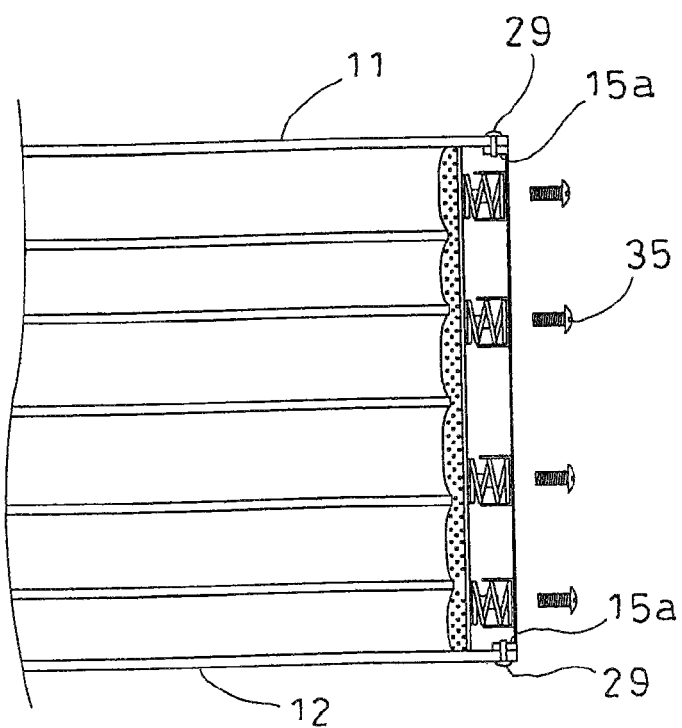
FIG. 5B is a drawing to show a condition where the right lateral plate is mounted and the coil spring is released, FIG. 6A and FIG. 6B each represents a relation among the coil spring and a right lateral plate and a flange nut.

In FIG. 5B, the spring holding bolt 35 is shown in completely removed state. In fact, however, a forward end of the spring supporting bolt 35 is engaged with the nut portion 34*a*. That is, a head of the spring supporting bolt 35 is separated from the right lateral plate 15. Therefore, even when the restriction by the spring supporting bolt 35 is released, the position of the springs 28 in vertical direction is maintained by the spring supporting bolt 35.

By incorporating the top plate 11, the bottom plate 12, the front plate 13, the rear plate 14, the right lateral plate 15, and the left lateral plate respectively, the heat exchanger 1 is set up. The heat transfer unit 3 can be fixed by holding the top plate 11 and the bottom plate 12. i.e. by holding the front edges 4*a* and 4*b* by means of the edge holding hardwares 18 and 18, and there is no need to use screws, welding process, etc. Further, at the same time as the fixation of the heat transfer unit 3, the first flow passage 7 and the second flow passage 8 can be air-tightly separated because the sealing members 6*a* and 6*b* are engaged with the front edges 4*a* and 4*b* respectively. Also, the lateral plate sealing member 26 is pressed and air-tightly sealed at left and right ends of the heat transfer unit 3. As a result, by simply incorporating the heat transfer unit 3 in the casing 2, the first flow passage 7 and the second flow passage 8 as air-tightly separated from each other can be formed.

The high temperature fluid inlet 21 and the high temperature fluid outlet 22 are communicated with the second flow passage 8, and the low temperature fluid inlet 23 and the low temperature fluid outlet 24 are communicated with the first flow passage 7.

In the embodiment as given above, due consideration has been given to heat loss, and the low temperature fluid 38 is allowed to pass to the first flow passage 7, which is in contact with the top plate 11 and the bottom plate 12. However, in a case where the heat exchanger 1 itself is disposed in the drying chamber, the high temperature fluid 37 may be passed to the first flow passage 7.

The heat exchanger 1 can be disassembled in easy manner, and the heat transfer unit 3 can be easily taken out. For the procedure of disassembling, the procedure to assemble the heat exchanger 1 can be performed in reverse direction. That is, the spring supporting bolt 35 is fastened first to turn to the condition so that reaction force of the spring 28 may not be applied on the right lateral plate 15, and the right lateral plate 15 and the left lateral plate 16 are removed. By removing the top plate 11 and the bottom plate 12 from the front plate 13 and the rear plate 14 as well as from the support pillars 19 and 19, all component parts of the heat exchanger 1 can be disassembled (see FIG. 4).

Therefore, each component can be cleaned up as a single piece, and the cleaning procedure can be performed in easy and perfect manner.

By applying the heat exchanger 1 to the dehumidifier 41, it is possible to have the dehumidifier 41 with high thermal efficiency and with good maintainability.

Figure 7:
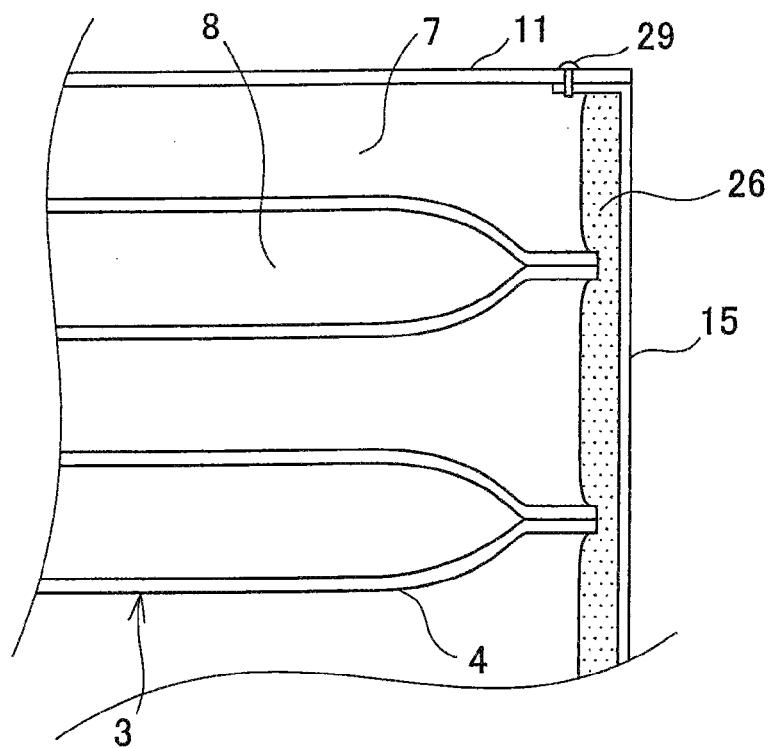
FIG. 7 is a partial cross-sectional view of a lateral end portion of a variation example of the heat exchanger.

FIG. 7 shows a variation example of the heat exchanger 1 in the present embodiment.

In this variation example, both of the lateral ends (right lateral end in FIG. 7) of the flat plates 4 and 4, which make up together the second flow passage 8, are bent and deformed so that both of the lateral ends are superimposed on each other. Further, the superimposed portions of the flat plates 4 and 4 are connected to each other by brazing or welding or the like. By connecting the superimposed portions with each other, both of the lateral ends of the second flow passage 8 can be closed air-tightly, and the second flow passage 8 is completely separated from the first flow passage 7. Also, it may be so arranged that the lateral ends of the first flow passage 7 are connected together so that the first flow passage 7 are completely separated from the second flow passage 8.

By arranging that the second flow passage 8 is separated from the first flow passage 7, the low temperature fluid 38 flowing in the first flow passage 7 and the high temperature fluid 37 flowing in the second flow passage 8 do not leak through gap between the flat plate 4 and the lateral plate sealing member 26 and are not mixed with each other even when the lateral plate sealing member 26 is deteriorated.

As a result, it can be so arranged that the low temperature fluid 38 and the high temperature fluid 37 can be different in composition and can have different property so that a gas flown along the first flow passage 7 and a liquid is flown along the second flow passage 8. It is possible to increase universal adaptability of the heat exchanger 1.

Figure 8:
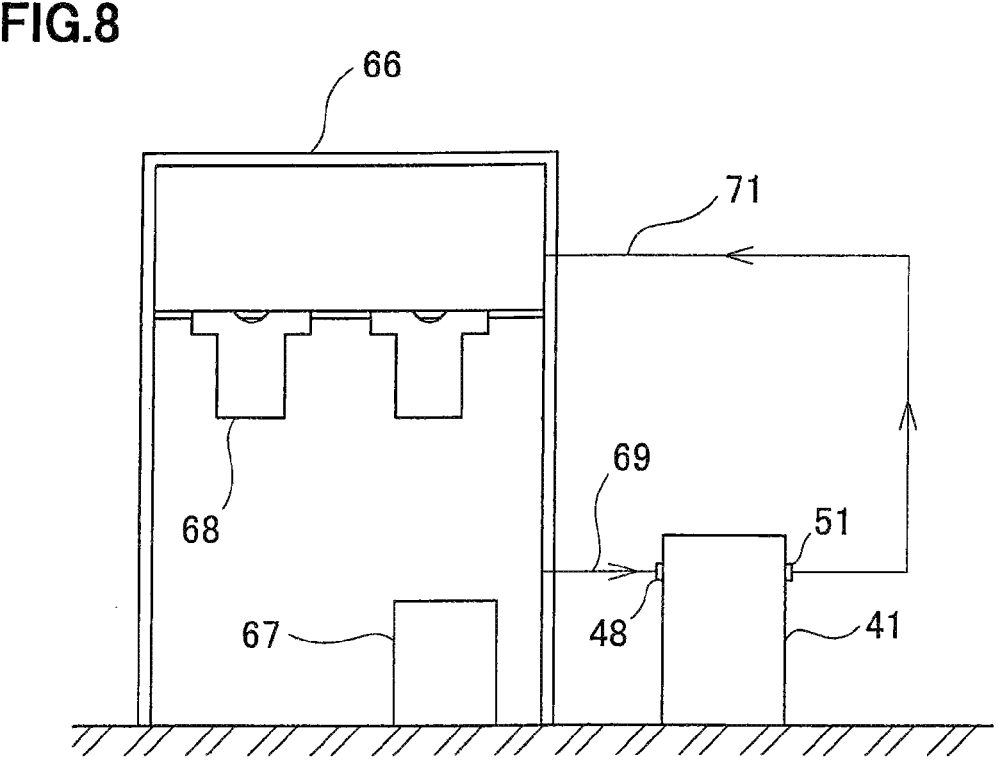
FIG. 8 is a schematical drawing to show approximate arrangement when the dehumidifier according to the present embodiment is applied in a drying chamber.

FIG. 8 shows a case where the dehumidifier 41 in the present embodiment is applied for the use in a drying chamber to dry up clothes.

In FIG. 8, reference numeral 66 represents a drying chamber, Heating devices 67 such as stove are installed in the drying chamber 66, and objects to be dried 68 such as damp clothes are accommodated.

A suction pipe 69 and a discharge pipe 71 are connected in the drying chamber 66. The suction pipe 69 is connected to the dehumidifier 41 via the suction inlet 48, and the discharge pipe 71 is connected to the dehumidifier 41 via the discharge inlet 51.

When the dehumidifier 41 is operated, the air in the drying chamber 66 is sucked into the dehumidifier 41 via the suction pipe 69, and the air thus sucked in is dehumidified in the dehumidifier 41, and the dehumidified air is introduced into the drying chamber 66 via the discharge pipe 71 as dry air.

By operating the dehumidifier 41, the humidity in the drying chamber 66 is decreased. Thus, the objects to be dried 68 can be perfectly dried up even when the temperature in the drying chamber 66 may not be risen.

Therefore, by applying the dehumidifier 41 in the drying chamber 66, there is no need any more to maintain the interior space at high temperature by means of the heating device 67, and the reduction of the fuel cost can be achieved.

The invention claimed is:

1. A dehumidifier, comprising a suction unit which humid air is sucked in, a dehumidifying unit having a chiller and for cooling down the humid air sucked in and for dehumidifying by condensing the moisture in the humid air, a discharge unit having a heat radiator and for heating and discharging dry air as dehumidified at the dehumidifying unit, a refrigerant circulating system for cooling down the humid air at the dehumidifying unit and for heating said dry air at said discharge unit, and a heat exchanger for performing heat exchange between said humid air and said dry air as dehumidified at said dehumidifying unit, wherein said heat exchanger comprises a casing arranged as a hollow box and a heat transfer unit accommodated in said casing, wherein said heat transfer unit is configured so that a flat plate is turned back alternately in opposite directions, and a first flow passage and a second flow passage are prepared alternately in many layers by said flat plate, and among a front plate and a rear plate running in parallel to a return line of said flat plate of said casing, on said front plate side, a high temperature fluid inlet and a high temperature fluid outlet, which are communicated with said second flow passage, are formed, a low temperature fluid inlet being communicated with said first flow passage is formed on said rear plate side at a position opposing said high temperature fluid outlet, a low temperature fluid outlet being communicated with said first flow passage is formed on said rear plate side at a position opposing said high temperature fluid inlet, said suction unit is disposed on said high temperature fluid inlet, said discharge unit is disposed on said low temperature fluid outlet, a suction fan is accommodated in said suction unit, an exhaust fan is accommodated in said discharge unit and said suction fan and said exhaust fan are configured so as to rotate integrally by a same fan motor, wherein said dehumidifying unit is configured so as to commonly have said high temperature fluid outlet as a fluid inlet to said dehumidifying unit and to commonly have said low temperature fluid inlet as a fluid outlet from said dehumidifying unit, and the air sucked in from said suction unit flows into said heat exchanger from said high temperature fluid inlet, flows into said dehumidifying unit via said high temperature fluid outlet, flows into said heat exchanger from said dehumidifying unit via said low temperature fluid inlet, wherein the air which flows into said dehumidifying unit and the air which flows out from said dehumidifying unit are heat exchanged in said heat exchanger and discharged from said discharge unit via said heat radiator.

2. A dehumidifier according to claim 1, wherein a partition is disposed in said dehumidifying unit, said partition providing a humid air flow passage which said humid air passes through and a dry air flow passage which said dry air passes through.

3. A dehumidifier according to claim 1 or 2, wherein a lateral plate sealing member to cover entire region of an end of said heat transfer unit and a pressing plate having rigidity are installed between lateral plate being at a position opposite to said end of said heat transfer unit and said heat transfer unit, a biasing means is disposed between said pressing plate and said lateral plate, said biasing means presses said lateral plate sealing member toward said end of said heat transfer unit via said pressing plate, and said lateral plate sealing member air-tightly blocks said first flow passage and said second flow passage.

4. A dehumidifier according to claim 3, wherein said biasing means is a coil spring arranged at a distribution rate as required, a flange nut is inserted from a side of said pressing plate of said coil spring, a spring supporting bolt to be inserted in said lateral plate is threaded on said flange nut, and by fastening said spring supporting bolt and by compressing said coil spring, pressing force onto the pressing plate of said spring is constrained, and by loosening said spring supporting bolt, constraining of said coil spring is released so that pressing force is applied onto said pressing plate.

5. A dehumidifier according to claim 3, wherein a flat plate on the uppermost portion and a flat plate on the lowermost portion of said heat transfer unit are folded back in the same direction, a respective sealing member is engaged with each of a forward end of the flat plate of said uppermost portion and a forward end of the flat plate of said lowermost portion, and said sealing members are squeezed by an edge holding hardware disposed on a top plate of said casing and said top plate, and by an edge holding hardware disposed on a bottom plate of said casing and said bottom plate, and said heat transfer unit is fixed.

6. A dehumidifier according to claim 4, wherein a flat plate on the uppermost portion and a flat plate on the lowermost portion of said heat transfer unit are folded back in the same direction, a respective sealing member is engaged with each of a forward end of the flat plate of said uppermost portion and a forward end of the flat plate of said lowermost portion, and said sealing members are squeezed by an edge holding hardware disposed on a top plate of said casing and said top plate, and by an edge holding hardware disposed on a bottom plate of said casing and said bottom plate, and said heat transfer unit is fixed.

7. A dehumidifier according to claim 3, wherein projecting portions are projected on each of a front side and a rear side of said flat plate folded back, said projecting portion on front surface of said flat plate and said projecting portion on rear surface are brought face to face to each other, and a gap serving as a flow passage is formed between said flat plates placed opposite to each other.

8. A dehumidifier according to claim 3, wherein side end portions of said flat plate are air-tightly connected so that said first flow passage or said second flow passage is blocked, and said second flow passage and said first flow passage are separated from each other.

9. A dehumidifier according to claim 4, wherein side end portions of said flat plate are air-tightly connected so that said first flow passage or said second flow passage is blocked, and said second flow passage and said first flow passage are separated from each other.

10. A dehumidifier according to claim 5, wherein side end portions of said flat plate are air-tightly connected so that said first flow passage or said second flow passage is blocked, and said second flow passage and said first flow passage are separated from each other.

11. A dehumidifier according to claim 6, wherein side end portions of said flat plate are air-tightly connected so that said first flow passage or said second flow passage is blocked, and said second flow passage and said first flow passage are separated from each other.

12. A dehumidifier according to claim 7, wherein side end portions of said flat plate are air-tightly connected so that said first flow passage or said second flow passage is blocked, and said second flow passage and said first flow passage are separated from each other.

* * * * *